W. E. BRIDWELL.
LOCALITY FINDER FOR MAPS AND THE LIKE.
APPLICATION FILED OCT. 11, 1920.
1,389,293. Patented Aug. 30, 1921.
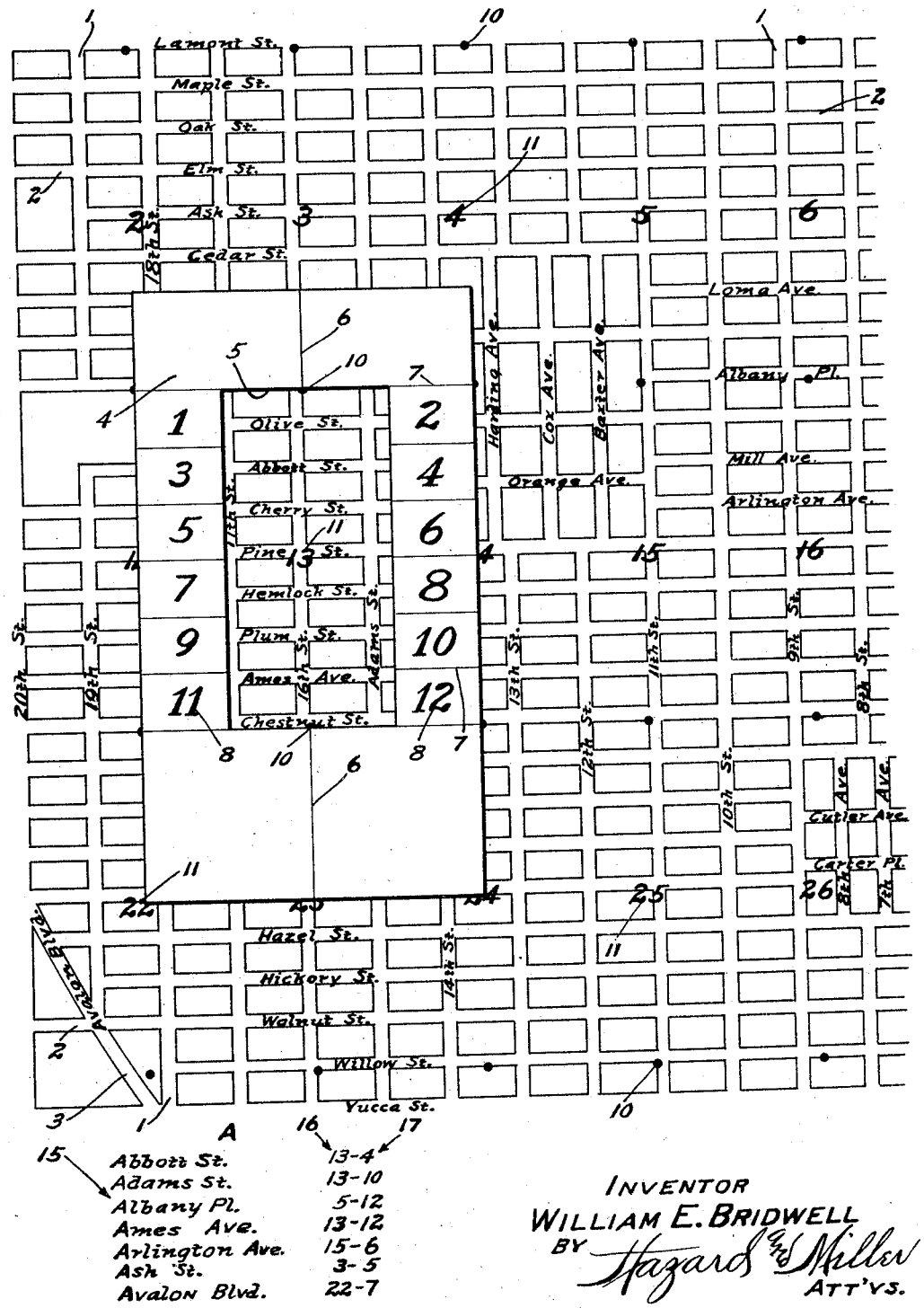
| Abbott St. | 13-4 |
| Adams St. | 13-10 |
| Albany Pl. | 5-12 |
| Ames Ave. | 13-12 |
| Arlington Ave. | 15-6 |
| Ash St. | 3-5 |
| Avalon Blvd. | 22-7 |
INVENTOR
WILLIAM E. BRIDWELL
BY Hazard & Miller
ATT'YS.

UNITED STATES PATENT OFFICE.

WILLIAM E. BRIDWELL, OF LOS ANGELES, CALIFORNIA.

LOCALITY-FINDER FOR MAPS AND THE LIKE.

1,389,293.      Specification of Letters Patent.      Patented Aug. 30, 1921.

Application filed October 11, 1920. Serial No. 415,974.

*To all whom it may concern:*

Be it known that I, WILLIAM EARL BRIDWELL, a citizen of the United States, residing at Los Angeles, in the county of Los Angeles and State of California, have invented new and useful Improvements in Locality-Finders for Maps and the like, of which the following is a specification.

It is the object of this invention to provide a map and finder for the same so arranged as to provide ready means for locating any desired point upon the map.

The invention will be readily understood from the following description of the accompanying drawing showing a plan view of a map constructed in accordance with the invention and having the improved finder placed thereon.

In the drawings I have shown a map of a portion of a city, but it will be obvious that the invention is as readily applicable to maps of various kinds.

The city streets shown upon the map are indicated by the cross streets 1 and 2 and by streets 3 extending diagonally across the cross streets. The names of the streets may be indicated upon the same in the usual manner.

A finder is employed in connection with the map, said finder comprising a frame 4 which may be of cardboard, or the like, and which defines a central rectangular opening 5. The medial line of the finder is indicated by the line 6, and the opposite sides of opening 5 are graduated by the laterally alined graduations 7 arranged along the sides of the frame comprising the finder at the opposite sides of opening 5. The spaces formed by graduations 7 may be provided with indicating means shown as numerals 8, the spaces at one side of the finder being, preferably, indicated by odd numerals, while the spaces at the opposite side of the finder being indicated by even numerals.

The opening in the finder will cover a certain portion of the map when laid upon the same, and the finder is arranged to be successively positioned upon portions of the surface of the map so that the aggregate of the divisions of the map exposed through the opening of the finder will embrace the entire area of the map. In order to so position the finder upon the map so that successive divisions of the latter will be exposed through the opening 5, positioning marks shown as dots 10 are placed upon the map, these marks being so positioned that when two of the same in vertical alinement upon the map are brought into position with relation to the finder wherein said dots are exposed at the upper and lower edges of opening 5 and in alinement with the line 6, the finder will be properly positioned so as to expose one of the divisions of the map. The successive divisions of the map thus arranged to be exposed, are provided with distinguishing means shown as the numerals 11.

An index is arranged upon the map of the points thereon which it may be desired to locate. Thus in the present example the index will contain the names of the streets shown upon the map, said names being alphabetically arranged as shown at 15. At one side of each of the names its division and subdivision distinguishing mark is noted. For this purpose the numeral denoting the division in which the street lies is, preferably, first noted, as shown at 16, and the number denoting the graduation upon the finder which will be adjacent the street when the finder is properly positioned to expose the division noted, is then marked upon the index as shown at 17.

Referring to particular examples of the working of the finder, it will be seen that Abbott street upon the index is followed by the notation 13—4. In order to locate Abbott street the opening of the finder is positioned over the division 13 with the dots defining said division in alinement with line 6 and at the upper and lower edges of opening 5. By looking opposite the subdivision 4 upon the finder, Abbott street may be readily found. In similar manner when the finder is upon division 13 Ames avenue will be readily located at the graduation denoting subdivision 12. Adams street running in the opposite direction will be located in similar manner at subdivision 10, the name designating this street appearing opposite this subdivision.

It will be understood that the index upon the map will have a complete alphabetical index so that any street may be similarly located, and it will be further understood that public buildings and other points of interest, such as parks and the like may be similarly indexed and located upon the map.

Various changes may be made without departing from the spirit of the invention as claimed.

What is claimed is:

1. The combination with a map, of a finder adapted to be placed upon the same, said map having directing marks for placing the finder arranged so that respective divisions aggregating the entire area of the map may be covered by said finder, indicating means upon the map for the respective divisions, said finder being graduated to subdivide the divisions and bearing indicating means for the subdivisions.

2. The combination with a map, of a finder adapted to be placed upon the same, said map having points marked thereon adapted to be alined with the finder so that respective divisions aggregating the entire area of the map may be covered by said finder, indicating means upon the map for the respective divisions, said finder having indicating means for subdivisions of the respective divisions.

3. The combination with a map, of a finder adapted to be placed upon the same, said map having directing marks for placing the finder arranged so that respective divisions aggregating the entire area of the map may be covered by said finder, indicating means upon the map for the respective divisions, said finder comprising a frame defining an opening and graduated at one of its sides to subdivide the divisions, and indicating means for the subdivisions.

In testimony whereof I have signed my name to this specification.

W. E. BRIDWELL.